Aug. 5, 1969  K. I. VAN DER HULSE  3,459,377
SPRINKLER HOSE CONSTRUCTION
Filed Nov. 14, 1967  2 Sheets-Sheet 2

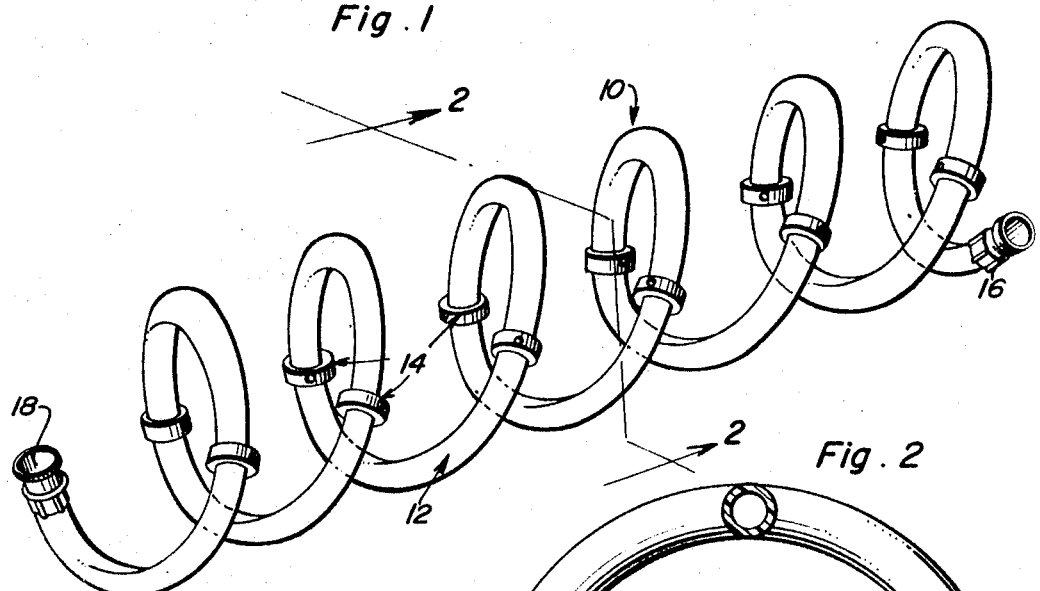
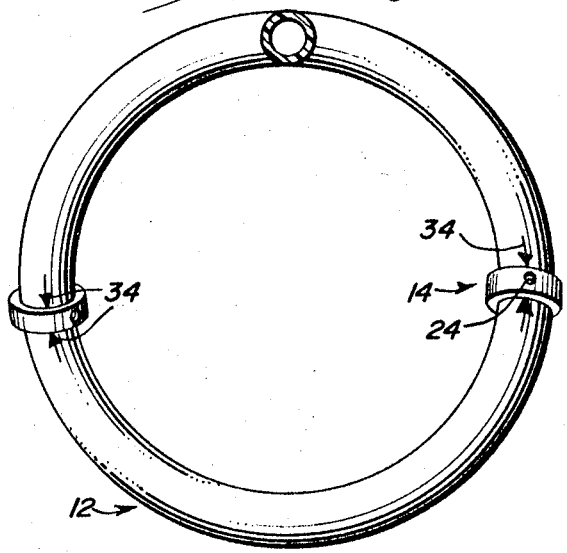
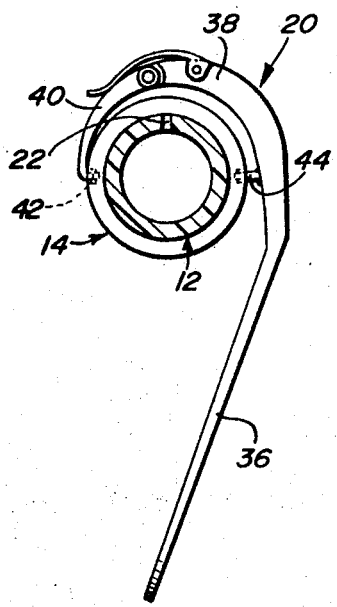
Kenneth I. Van der Hulse
INVENTOR.

Kenneth I. Van der Hulse
INVENTOR.

BY Clarence A. O'Brien
and Harvey B. Jacobson
Attorneys

United States Patent Office 3,459,377
Patented Aug. 5, 1969

3,459,377
SPRINKLER HOSE CONSTRUCTION
Kenneth I. Van der Hulse, P.O. Box 229,
Palm Beach, Fla. 33480
Filed Nov. 14, 1967, Ser. No. 682,799
Int. Cl. A01g 25/02
U.S. Cl. 239—394         10 Claims

ABSTRACT OF THE DISCLOSURE

Plant watering apparatus comprising an elongated spirally formed water conveying hose capable of being expanded and contracted within the limits of the spiral configuration and maintaining an adjusted position. A plurality of valve collars are rotatably mounted on the hose at spaced points along the length thereof in overlying relation to water discharging outlets or holes in the hose itself. Each of the valve collars includes a plurality of spray ports therein selectively alignable with the hose outlet so as to obtain a variety of different spray patterns upon an adjustment of the valve collar.

---

The instant invention is generally concerned with apparatus for watering plants, flower beds, and the like, and more particularly relates to an adjustable hose system which can quickly be accommodated to any plant or flower layout and adjusted so as to provide the most appropriate of a variety of spray patterns.

As will be appreciated by the amateur horticulturist, the proper watering of annuals, shrubs, etc. through the utilization of conventional sprinkler or soaker hoses has several drawbacks. Such hoses tend to have a relatively short useful life due to an enlarging of the outlet perforations, can only provide a single spray pattern, and frequently become covered with soil or debris, thus impairing their effectiveness.

Accordingly, it is a primary object of this invention to provide a sprinkler hose construction which avoids the defects of the conventional sprinkler and soaker hoses and in fact constitutes a significant advance in the art.

More particularly, it is an object of the instant invention to provide a spirally shaped hose capable of being expanded, contracted, bent around obstacles or conformed to specific patterns, and provided in series with either like hoses or conventional hoses as required.

In conjunction with the above object, it is also a significant object of the invention to provide the spiral hose with valve controlled outlets at spaced points along the length thereof with each outlet associated valve being adjustable so as to provide any of a plurality of different spray patterns, or as an alternative completely shut off.

Another object of the instant invention resides in the provision of a sprinkler hose which can be easily collapsed for storage, shipping, or the like, and which, when extended, is so constructed as to engage the ground at spaced points thereby facilitating its positioning about growing plants and the like.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the sprinkler hose construction comprising the instant invention;

FIGURE 2 is an enlarged cross-sectional view taken substantially on a plane passing along line 2—2 in FIGURE 1;

FIGURE 3 is a view illustrating the manner in which the valve collars or rings are to be adjusted through the utilization of a wrench;

Figure 4:
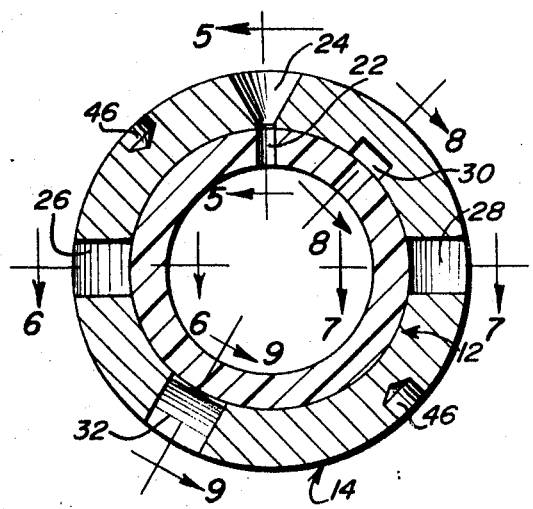
FIGURE 4 is an enlarged cross-sectional view through one of the valve collars illustrating the plurality of spray ports associated therewith.

Referring now more specifically to the drawings, reference numeral 10 is used to generally designate the sprinkler hose construction comprising the instant invention. This construction includes basically an elongated spirally shaped water conveying tube or hose 12, and a plurality of valve collars 14 mounted at spaced positions along the length of the hose 12.

The hose 12 can be constructed of any conventional hose material, for example plastic or rubber, with the hose 12, either during the forming thereof or in a suitable manner subsequent thereto, being configured so as to define a spiral shape comprising a series of substantially circular convolutions. While the hose, so formed, may possibly have a slight elastic memory due to the nature of the material and the spiral configuration, it is contemplated that this be kept at a minimum whereby the hose can assume and retain any expanded arrangement, of course within predetermined limits depending upon the diameter of the convolutions, etc., through for example the frictional resistance to a collapsing of the hose developed by an engagement with the ground.

The opposite ends of the hose 12 are provided with conventional male and female hose couplings 16 and 18 which enable the interconnecting of a series of the hoses 12 either directly to each other or through intermediate imperforate lengths of conventional hose for spanning areas wherein no watering is desired.

As will be appreciated from FIGURE 1, preferably two valve collars 14 are mounted on each convolution. Each of these collars 14 encircles and frictionally engages the hose 12 in a manner so as to provide a water-tight engagement therebetween requiring, preferably, the utilization of mechanical means, such as the wrench 20, for effecting a rotational adjustment of each valve collar 14. Underlying each valve collar 14, which incidently is preferably made of the same material as the hose 12 so as to avoid any problem of relative expansion and contraction, is a water discharging outlet or opening 22 in the hose 12 itself. The associated valve collar 14 is in turn provided with a series of spray ports 24, 26, 28, 30 and 32 at circumferentially spaced points thereabout, each of said ports being selectively aligned with the hose outlet or opening 22 for the spray discharge of water therethrough.

Figure 5:
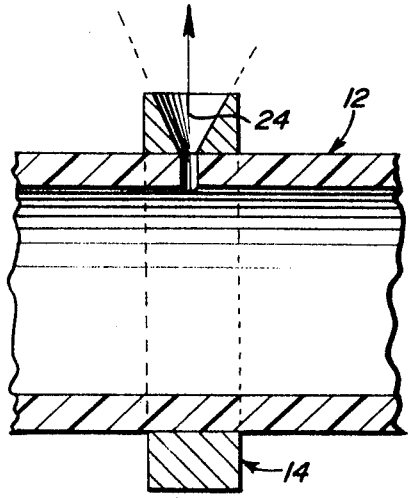
FIGURES 5 through 9 constitute cross-sectional views taken on the corresponding lines in FIGURE 4, illustrating the distinct spray pattern defining ports of the valve collar.
Figure 6:
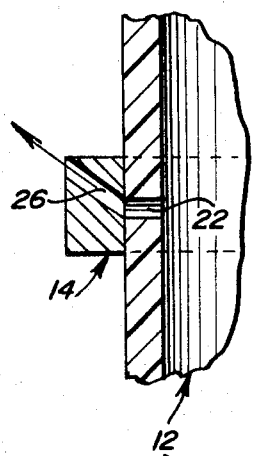
Figure 7:
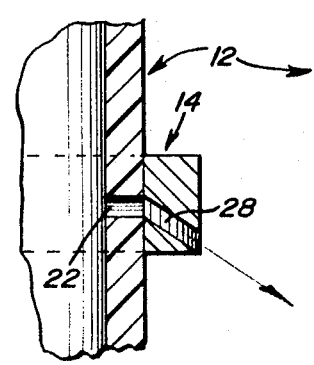
Figure 8:
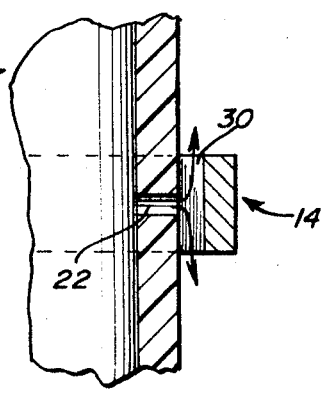
Figure 9:
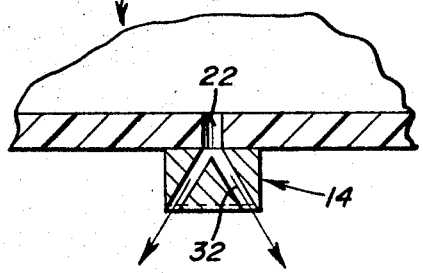

While not specifically restricted thereto, it is contemplated that the port 24 be of a conical configuration expanding outwardly from the hose 12 so as to produce a full spray. The ports 26 and 28 are to comprise channels or slots sloped in opposed directions so as to effect, as desired, a spraying to either the right or the lift. The port 30 is to be orientated through the collar 14 perpendicularly across the outer end of the hose opening 22 so as to provide for a flowing of the water from the hose along the length of the hose itself producing in effect a soaking type discharge. Finally, the port 32 is to include a pair of oppositely directed channels so as to effect a simultaneous spraying of the water to opposed sides of the hose outlet 22. The general flow path associated with these ports has been illustrated in FIGURES 5 through 9.

In order to assist in maintaining the collars 14 properly aligned on the hose 12, opposed arrows or other appropriate aligning marks 34 can be embossed, printed or otherwise provided on the hose 12 as suggested in FIGURE 2. These marks 34 can further, if so desired, be aligned with the corresponding hose opening 22 so as to also simplify the alignment of any one of the valve ports therewith. As noted previously, it is contemplated that the collars 14 be so frictionally engaged with the hose 12 as to require, in most instances, the assist of a tool, such as wrench 20, in effecting the rotational adjustment of each collar 14. This frictional engagement with the hose 12 will suffice to maintain the selected port and hose opening 22 in water passing alignment with each other. By the same token, if deemed desirable, opposed ribs or the like can be provided to each side of each of the collars 14 so as to function both as a guide means and an additional leakage preventing means. The adjusting wrench 20, as will be appreciated from FIGURE 3, can include, in addition to an elongated handle 36, an arcuate head portion 38 to which a spring-biased finger 40 is pivotally mounted. The free end of the finger will be provided with an appropriate lug 42 in general diametric alignment with a similar lug 44 on the main portion of the wrench, these lugs engaging within a pair of opposed blind recesses 46 in each collar 14 for effecting a positive gripping of the collar 14 during the adjustment thereof. Incidently, with regard to this rotational adjustment of the collars 14, it should be appreciated that a complete closing of the associated hose outlet 22 can be effected by rotating the corresponding collar 14 so as to align the hose outlet opening 22 with the collar 14 between an adjacent pair of ports.

With reference again to FIGURE 1, it will be appreciated that, through the provision of at least two valve collars on each convolution of the hose 12, such normally being at generally diametrically opposed points, at least one of each pair of collars 14 can be maintained above ground level so as to avoid the possibility of soil or debris collecting thereover in a manner which would tend to affect the discharge therefrom. Actually, it is contemplated that both collars normally be positioned in this desired elevated position, such being easily effected through the spiral nature of the hose which requires that only a small portion of each convolution actually engage the ground. This latter feature is also of significance in accommodating the hose to a variety of layouts without the necessity of directly engaging the ground along the full length of the hose 12. One other advantage associated with the elevated position of the spray port containing valve collars is the fact that easy access thereto is possible for an adjustment thereof as desired.

From the foregoing, it will be appreciated that a unique hose construction has been defined, such construction providing a hose which can be readily extended from a completely collapsed position to a spiral expanded position, locating a plurality of water discharging holes at longitudinally spaced points, the spray discharged from each hole being adjustable directly at the hole itself so as to either provide any of a plurality of spray patterns or completely shut off the discharge therethrough. The spiral nature of the hose provides for an elevated location of the water discharge openings with the utilization of valve collars not only providing for a variation of the spray pattern, but also greatly reducing the tendency for the hose openings to enlarge over extended periods of use.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to.

What is claimed as new is as follows:

1. Sprinkler hose construction comprising a length of water hose, said hose being formed into a spiral configuration defining a continuous series of convolutions, said spiral hose being longitudinally extensible and retractable, said hose including water discharging means at longitudinally spaced points therealong.

2. The construction of claim 1 wherein each convolution has a pair of said water discharging means therein.

3. The construction of claim 2 wherein said water discharging means comprises, in each instance, an outlet opening in said hose.

4. The construction of claim 3 including valve means mounted on said hose in association with each outlet opening, said valve means being movable for a selective opening and closing of the associated opening.

5. The construction of claim 4 wherein said valve means includes a series of different spray ports therein selectively alignable with the corresponding outlet opening for varying the spray pattern of the water discharged therethrough.

6. The construction of claim 5 wherein each of said valve means comprises a collar encircling the hose and frictionally engaged therewith.

7. The construction of claim 1 wherein said water discharging means includes means for varying the spray pattern of water discharged therethrough.

8. The construction of claim 7 including means for selectively closing each water discharging means independently of the remaining water discharging means.

9. A longitudinally extensible and retractable hose defining a generally spiral configuration providing a plurality of convolutions along the length thereof, each convolution including at least one water discharging outlet therein.

10. The construction of claim 9 wherein each water discharging outlet is in general longitudinal alignment with the remaining water discharging outlets.

References Cited

UNITED STATES PATENTS

| 1,657,538 | 1/1928 | Koepf | 239—436 |
|---|---|---|---|
| 2,764,893 | 10/1956 | Kalkenberg | 239—209 |
| 3,021,871 | 2/1962 | Rodgers | 138—118 |
| 3,094,283 | 6/1963 | Balister | 239—394 |
| 3,095,151 | 6/1963 | MacChesney | 239—551 |
| 3,237,872 | 3/1966 | Miney | 239—551 |
| 3,240,434 | 3/1966 | Bradley | 239—450 |
| 3,288,169 | 11/1966 | Moss | 138—118 |

FOREIGN PATENTS 1,324,289   3/1962   France.

EVERETTE W. KIRBY, Primary Examiner

U.S. Cl. X.R.

138—119; 239—392, 437, 451, 551, 562, 563